(12) United States Patent
Schwaar et al.

(10) Patent No.: US 7,104,746 B2
(45) Date of Patent: Sep. 12, 2006

(54) DEVICE FOR THE DISPLACEMENT AND/OR POSITIONING OF AN OBJECT IN FIVE AXES

(75) Inventors: Claudia Schwaar, Hartmannsdorf (DE); Reimund Neugebauer, Niederwartha (DE); Michael Schwaar, Hartmannsdorf (DE)

(73) Assignees: Metrom Mechatronische Maschinen GmbH, Chemnitz (DE); Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/836,594

(22) Filed: Apr. 30, 2004

(65) Prior Publication Data
US 2005/0001368 A1    Jan. 6, 2005

Related U.S. Application Data

(63) Continuation of application No. PCT/EP02/11466, filed on Oct. 14, 2002.

(30) Foreign Application Priority Data
Nov. 2, 2001  (DE) ................. 101 53 854

(51) Int. Cl.
*B25J 17/02*    (2006.01)
(52) U.S. Cl. ................... 414/735; 74/490.06
(58) Field of Classification Search ............. 414/680, 414/729, 735; 74/495.05, 490.06
See application file for complete search history.

(56) References Cited

U.S. PATENT DOCUMENTS 4,776,749 A * 10/1988 Wanzenberg et al. ....... 414/680

* cited by examiner

*Primary Examiner*—Donald Underwood
(74) *Attorney, Agent, or Firm*—Jordan and Hamburg, LLP

(57) ABSTRACT

The invention relates to a displacement and/or positioning device for the displacement and/or positioning of an object in five axes, comprising an object support and five coupling members which support the object support in a frame, whereby four of the five coupling members are each connected to the object support by means of a first joint arrangement each with two degrees of freedom and the remaining one of the five coupling members is connected to the object support by means of a second joint arrangement with one degree of freedom.

12 Claims, 8 Drawing Sheets

DEVICE FOR THE DISPLACEMENT AND/OR POSITIONING OF AN OBJECT IN FIVE AXES

CROSS-REFERENCE TO RELATED INVENTIONS

This is a continuation of International Application PCT/EP02/11466, with an international filing date of Oct. 14, 2002, and German Patent Application No. DE 101 53 854.5, filed on Nov. 2, 2001.

BACKGROUND OF THE INVENTION

1. Field of the Invention

This invention relates to a movement and/or positioning device with pentaxial movement and/or positioning of an object.

2. State of the Prior Art

This movement and/or positioning device can be employed especially with machines which move an object in five degrees of freedom, such as for example machine tools and machines for assembly and handling.

Known movement and/or positioning devices often use arrangements of a number of interconnected movement platforms, built up on one another and with a serial structure of corresponding movement axes of the movement platforms. This type of serial arrangement is realised, for example, with conventional machine tools with two movement platforms, whereby the drive axes of such a conventional machine tool are established one on the other. This means that the first axis bears (part of) the following second axis which is usually arranged orthogonal to the first axis.

In these types of movement and/or positioning devices with serial arrangements it follows that normally five independent drives are required for the realisation of pentaxial movements.

Taking the above reasoning into consideration, it is necessary with serial arrangements when moving or positioning an object to move the combined mass of all preceding movement platforms. Applied to the individual drives of the movement platforms, this means that the largest mass must be moved in each case by the first drives of a drive chain and that the individual drives of a drive chain in each case move different masses. Accordingly, this sort of movement and/or positioning device exhibits low dynamic characteristics for movement or positioning. In addition, any movement or positioning errors which occur are summed due to the coupled movement of the movement platforms with respect to one another during the movement and/or positioning. Furthermore, this sort of serial arrangement exhibits a low number of components of the same type, i.e. few repeated components, enabling only a restricted degree of modularisation.

Parallel kinematics offer an alternative. In this respect, this includes movement and/or positioning devices, generally termed hexapods, which exhibit six guide chains, which are also termed struts, each with five degrees of freedom at the joints, whereby normally rotation of the struts (guide chains) about their own longitudinal axis is prevented. Accordingly, the struts exhibit in each case a joint with three degrees of freedom and a further joint with two degrees of freedom, whereby one joint per guide chain is implemented as a drive. The drive of the guide chains is formed as a rotary or thrust drive which is supported in a frame or is integrated into the guide chain.

Consequently, in terms of gear systems this type of hexapod has six degrees of freedom of movement. Since a body to be moved or positioned always has six degrees of freedom, six drives are also needed to influence all six degrees of freedom. Most machine tools however only need five controllable degrees of freedom. This occurs, for example, with a milling machine in which the sixth degree of freedom is represented by rotation about the axis of the milling spindle.

One disadvantage with known hexapods is therefore that six drives must be used to generate five controllable degrees of freedom.

A further disadvantage with hexapods is the working space which is severely restricted due to the six guide chains, the said working space being determined by the boundaries of the swivel angles on an object or object holder to be moved. In principle, as the number of implemented guide chains increases, i.e. the total number of struts used which connect an object or an object holder to the frame, the available working space becomes smaller, because greater regions of collision between the guide chains restrict this working space.

Furthermore, arrangements are known for producing pentaxial movements with five drives which are arranged mixed parallel and serial. Here, the suggestion is made that three guide chains (termed struts in the following), variable in length, are arranged in parallel between a frame and an object holder. With the associated drives movement over all five axes is realised, whereby these axes, however, cannot be controlled separately. To compensate for the necessarily occurring swivel movements, the object holder exhibits two further serially arranged swivel axes.

A disadvantage of this type of arrangement is that the serially arranged swivel axes, which must be active in the space for all movements, limit the dynamic characteristics of the movement and/or positioning device. In addition, the increased mass is disadvantageous, which the drives of the struts, varying in length, must move.

In U.S. Pat. No. 4,569,627 a movement and/or positioning device is suggested in which exclusively three struts for linking the object holder to the frame are used. These three struts can be controlled in their length. In addition, two of the three struts can execute a torsional movement.

A significant disadvantage of this movement and/or positioning device is the stress on the struts in the torsion or bending direction. Since the rods formed as struts exhibit a high longitudinal stiffness, but are very compliant in the torsion and bending direction, this type of movement and/or positioning device exhibits a limited overall stiffness and a limited dynamic performance.

SUMMARY OF THE INVENTION

It is the object of this invention to provide a movement and/or positioning device which enables the highly dynamic moving and/or positioning of objects with five degrees of freedom.

This object is solved according to the invention by a movement and/or positioning device with the characteristics of Claim 1.

The movement and/or positioning device according to the invention for pentaxial movement and/or positioning of an object exhibits an object holder and five coupling links, which support the object holder in a frame. Four of the five coupling links are each connected to the object holder by means of a first joint arrangement with two degrees of freedom in each case, and the corresponding other link of the five coupling links is connected to the said object holder with a second joint arrangement with one degree of freedom.

Accordingly, the movement and/or positioning device according to the invention forms a parallel kinematic system with five coupling links for highly dynamic movement and/or positioning of the object.

Compared to hexapods, with this movement and/or positioning device a coupling link (and therefore also a drive chain) is saved. Consequently, a comparatively larger working space and in particular also a larger positioning angle of the object holder is obtained. As a result, this movement and/or positioning device exhibits an advantageous ratio between the required installation space and the usable working space.

With the combination of the first and second joint arrangements on the object holder a high stiffness is achieved. The stiffness needed for this type of highly dynamic movement is provided in particular in that the forces acting on an object, for example a milling spindle, in a Cartesian co-ordinate system in all three co-ordinate directions X, Y and Z are transferred into the coupling links exclusively as longitudinal forces. In addition, moments which act on the object in the two swivel directions are transferred into the coupling links exclusively as longitudinal forces. Furthermore, the reduction in the number of degrees of freedom of the second joint arrangement has the effect that the rotation of the object holder about a longitudinal axis of the holder is transferred into the strut, which is connected to the object holder using this second joint arrangement, as a bending and/or torsion stress.

The stiffness of this movement and/or positioning device is achieved here with comparatively small masses of the machine components, whereby good dynamic characteristics are made possible.

The movement and/or positioning device according to the invention also exhibits a high modularity, i.e. a high number of repeated components.

According to a preferred embodiment the movement and/or positioning device exhibits a first type of first joint arrangements with two joint axes, whereby one of the two joint axes is superimposed with a longitudinal axis of the object holder and/or a longitudinal axis of the object and the two joint axes are arranged together to be free of intersections. Preferably the first of the two joint axes of all the first joint arrangements of the first type are arranged superimposed with the same longitudinal axis of the object holder and/or of the object. The two joint axes of the first type of the first joint arrangements can here be arranged perpendicular to one another. In addition, the first type of the first joint arrangements can exhibit a jointed ring, which supports the object holder rotationally about the longitudinal axis of the object holder, whereby the jointed ring is connected to the associated coupling link via another joint with one degree of freedom, especially a hinged joint.

According to a further preferred embodiment, this movement and/or positioning device exhibits a second type of first joint arrangements with a cardan joint, especially a universal joint, with two joint axes, whereby the joint axes of the same intersect in a joint point. This joint point of the second type of the first joint arrangements can be arranged on the longitudinal axis of the object holder and/or the longitudinal axis of the object.

The previously mentioned four of the five coupling links can be connected to the object holder in each case using a first joint arrangement of the first type or in each case with a first joint arrangement of the second type or using first joint arrangements of the first and second types.

According to a further preferred embodiment the second joint arrangement exhibits a jointed ring, whereby the jointed ring rotationally rigidly supports the object holder about the longitudinal axis of the object holder and/or about the longitudinal axis of the object and is connected to the associated coupling link via a joint with one degree of freedom, in particular a hinged joint. In particular in this embodiment, the modularity of this movement and/or positioning device is fulfilled to a high degree.

Alternatively, the second joint arrangement can exhibit a joint with one degree of freedom, in particular a hinged joint, whereby this joint directly connects the corresponding coupling link to the object holder and supports the object holder rotationally rigidly about the longitudinal axis of the object.

According to a further preferred embodiment, the coupling links are each supported in the frame using a cardan suspension with two degrees of freedom.

According to a particularly preferred embodiment, a distance between the individual cardan suspensions and the first joint arrangements and the second joint arrangement is formed variable in length. Here, the coupling links can be formed as threaded spindles, whereby the threaded spindles are accommodated in the cardan suspensions in each case in a holding device with internal thread, especially a nut and whereby the nut can be rotated with respect to a longitudinal axis of the threaded spindles using a drive device.

At the same time or alternatively to the formation of the coupling links as threaded spindles, a device which is variable in length, especially a lifting cylinder can be arranged between the first joint arrangements and the second joint arrangement, whereby one rotational degree of freedom is facilitated about a longitudinal axis of the lifting cylinder using a drive device.

According to a further preferred embodiment a distance between the individual cardan suspensions and the first joint arrangements or the second joint arrangement is formed invariable in length, whereby the cardan suspensions are in each case arranged for movement along one axis in the space, particularly along a longitudinal axis of the coupling links.

The movement and/or positioning device according to the invention is especially formed as a machine tool, whereby the object includes a spindle and the object holder a spindle housing.

Preferably this movement and/or positioning device exhibits a machine table with a further rotational axis, particularly for the accommodation of a work-piece to be machined. The rotational axis of the machine table can be superimposed on the longitudinal axis of the object holder and/or the longitudinal axis of the object.

By adding this type of further rotational axis which is arranged in the machine table, then particularly with machine tools full five-sided machining of a work-piece is possible.

The movement and/or positioning device according to the invention can include a control unit for the control of the movement and/or positioning of the object holder and/or of the object. In addition, the control unit can be formed to be programmable, particularly as an NC control unit. The NC control unit can contain exactly five programming axes, whereby the NC control unit exhibits a programming module for the production of six machine axes from the five programming axes specified in the program and whereby the six machine axes can be assigned to the individual coupling links and to the rotational axis of the machine table. The programming module of the NC control unit can be provided for a calculation of a quality criterion and an extreme value for the quality criterion, whereby a setting of the rotational axes of the machine table can be determined using the extreme value.

According to a further especially preferred embodiment, the frame is formed as an icosahedron, whereby the cardan suspensions are arranged on selected faces of it.

Further preferred embodiments of the movement and/or positioning device are set forth in the corresponding further dependent claims.

BRIEF DESCRIPTION OF THE DRAWINGS

The invention is explained in more detail in the following based on preferred embodiments in conjunction with the associated drawings. The following are shown in the drawings.

DETAILED DESCRIPTION OF THE PREFERRED EMBODIMENTS

Figure 1:
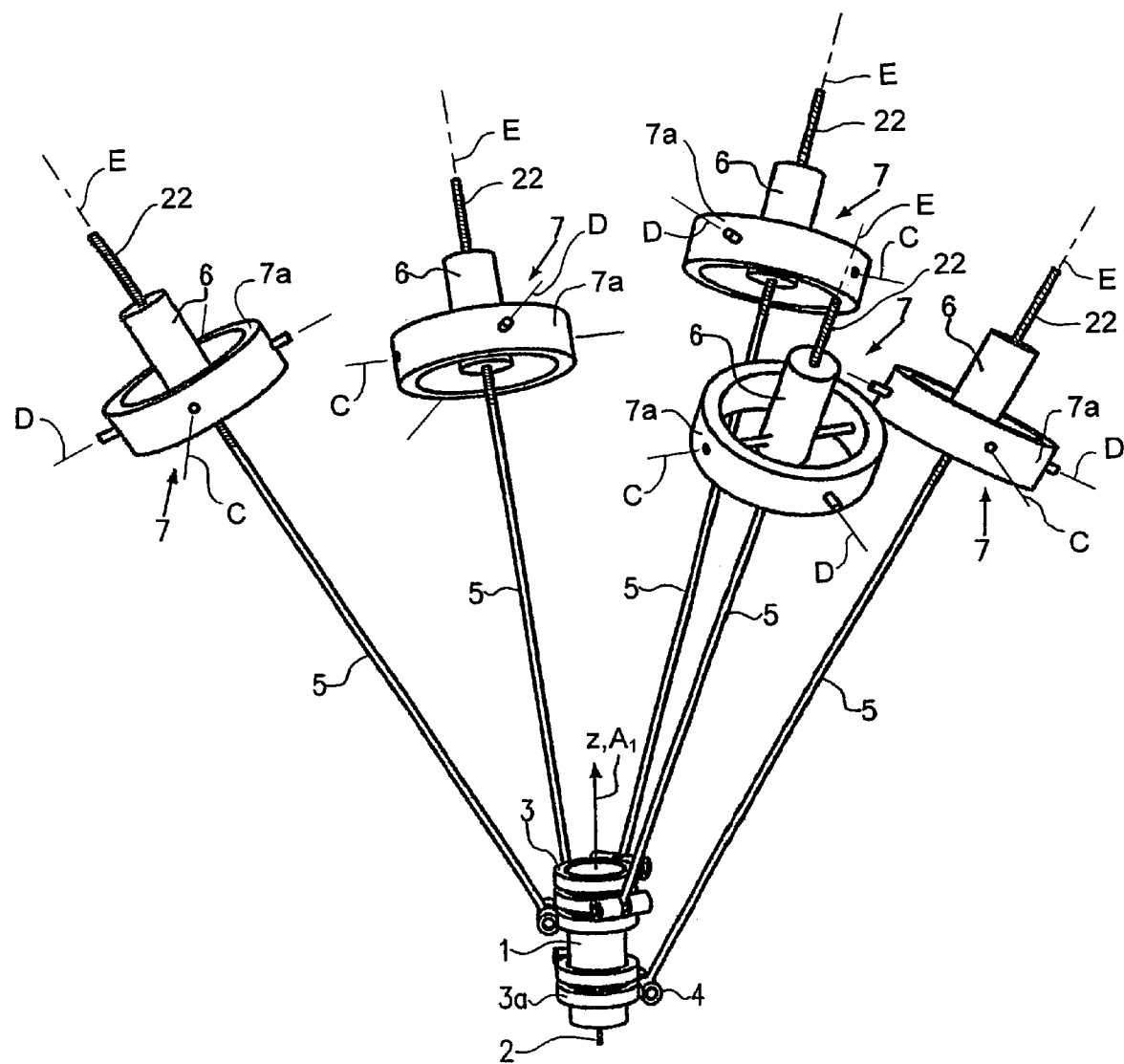
FIG. 1 is a schematic spatial illustration of an embodiment of the movement and/or positioning device.
Figure 1A:
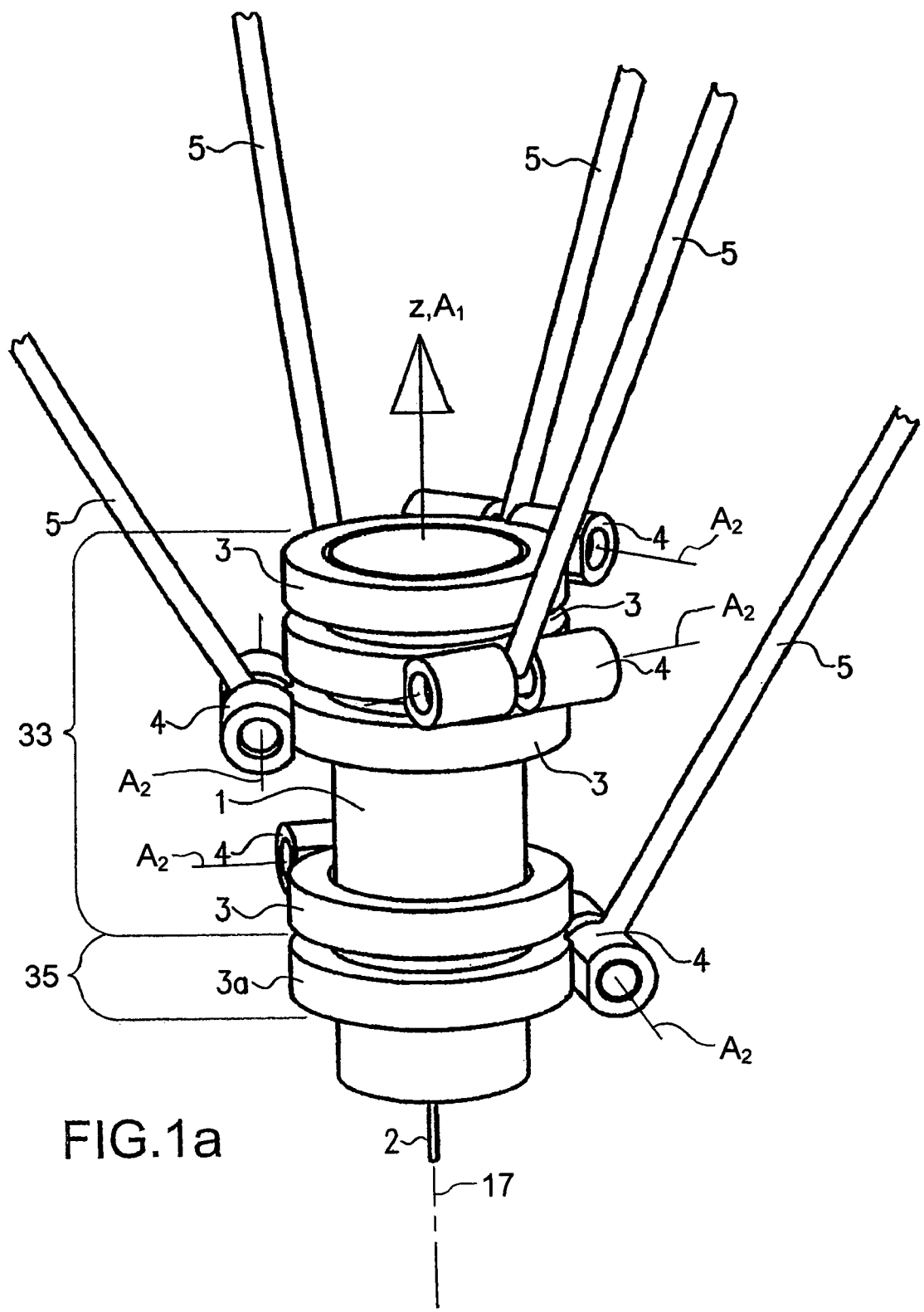
FIG. 1a is an enlarged illustration of an object holder according to FIG. 1 with a suspension of it and an object accommodated in it.

FIGS. 1 and 1a show a first embodiment of this movement and/or positioning device in the application of a machine tool. Machining of the work-piece 11 shown in FIG. 3 occurs using a milling spindle 2, which in the following is generalised by designation as the object to be moved or to be positioned. The milling spindle 2 is accommodated for rotational movement in a tubular spindle holder 1, whereby the spindle holder 1 is generalised in the following by designation as the object holder, and whereby the spindle holder 1 (object holder) and milling spindle 2 (object) form a mechanical unit in this embodiment. A drive and a controller for a rotational movement of the milling spindle 2 can for example occur using a drive unit arranged (not shown) in the spindle holder 1.

One longitudinal axis of the object holder 1 and one longitudinal axis of the milling spindle 2 are arranged coaxially with respect to one another. Consequently, in the embodiment shown, the longitudinal axis (symmetrical axis) of the spindle holder 1 corresponds to the longitudinal axis of the spindle (spindle axis), whereby this movement and/or positioning device is not restricted to this coaxial arrangement of the longitudinal axes. Rather, particularly the longitudinal axis of the milling spindle 2 can be arranged eccentrically to the longitudinal axis of the object holder 1 without significant modifications being required to this movement and/or positioning device.

In the embodiment shown in FIGS. 1 and 1a the milling spindle 2 is arranged in the spindle holder 1 along an axis designated the Z axis, i.e. in the position of the object holder 1 shown in FIGS. 1 and 1a the longitudinal axis of the object holder 1 corresponds to the illustrated Z axis of the Cartesian co-ordinate system. The Z axis designates here the vertical axis of the Cartesian co-ordinate system in space, whereby this can include a z axis in the co-ordinate system of the (machine) frame 12 (FIGS. 4A, 4B, 4C) and a z axis in the co-ordinate system of the object holder 1. The z axis in the co-ordinate system of the (machine) frame 12 and the z axis in the co-ordinate system of the object holder 1 are only identical in the centre-point position of both axes.

Figure 3:
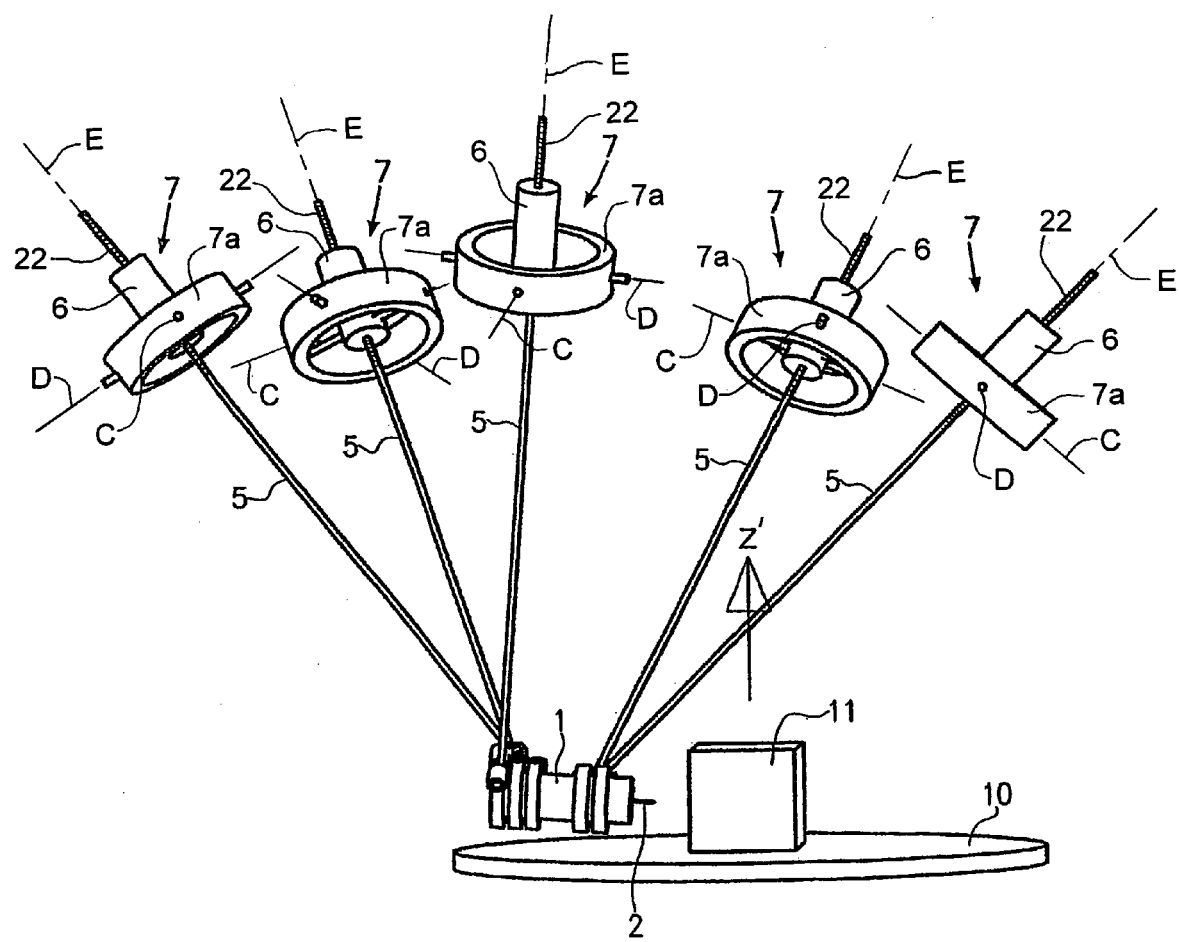
FIG. 3 is a schematic spatial illustration of a further embodiment with a rotationally movable table.

An X, Y plane fixed by the other axes of the Cartesian co-ordinate system is defined in FIG. 3 by the machine table. The object holder 1 and therefore also the milling spindle 2 is swivelled with regard to the Z axis and in a plane parallel to the X, Y plane. This type of swivel movement is illustrated in FIG. 3, whereby the object holder 1 is swivelled in the position shown in FIG. 3 with respect to the Z axis and in a plane parallel to the X, Y plane.

In the embodiment shown in FIGS. 1, 1a and 3 the object holder 1 passes through five jointed rings 3, 3a, whereby the object holder 1 is accommodated for rotational movement about the longitudinal axis $A_1$ of the object holder 1 in four of the five jointed rings 3. The other, fifth jointed ring 3a is permanently connected to a tubular sheath surface of the object holder 1, whereby it is rotationally fixed with respect to the longitudinal axis $A_1$ of the object holder 1. For the rotationally fixed connection any of the five illustrated joint discs 3, 3a can be selected. The decisive factor is only that the object holder 1 is accommodated rotationally fixed in one of the jointed rings 3a and in the corresponding other jointed rings 3 can be rotated with respect to the longitudinal axis $A_1$ of the object holder 1.

In the embodiment illustrated in FIGS. 1 and 1a the jointed rings 3, 3a are arranged in two groups, one with three and one with two jointed rings, whereby these two groups are arranged at a larger distance to one another. This type of grouping and a distance between this type of group can be selected based on the constructive framework conditions with regard to the existing building space, the required working space and the required swivel angle.

Furthermore, each of the five jointed rings 3, 3a is connected to a further joint 4 with one degree of freedom in each case. The four jointed rings 3, in which the object holder 1 is accommodated for rotational movement about the longitudinal axis z of the object holder 1, form in each case a so-called first joint arrangement 33 with one of these further joints 4 with one degree of freedom.

The first joint arrangement 33, comprising four sets of a jointed ring 3 and a joint 4, exhibits as a result a first joint axis $A_1$, which is coincident with the longitudinal axis z of the object holder 1, as best seen in FIG. 1a. The spindle axis 17, i.e. the longitudinal axis of the object 2, is arranged in the embodiment shown such that it coincides with the first joint axis $A_1$ of the first joint arrangement 33. Furthermore, the first joint axes $A_1$ of all the jointed ring 3 and joint 4 sets of the first joint arrangement 33 coincide with one and the same longitudinal axis z of the object holder 1.

In addition, each of the sets of a jointed ring 3 and joint 4 of the first joint arrangement 33 exhibits a second joint axis $A_2$, which coincides with the joint axis of the joint 4 with one degree of freedom. Each of the second joint axes $A_2$ of the first joint arrangement 33, i.e. the joint axes $A_2$ of the further joints 4 with one degree of freedom, is oriented in relation to the longitudinal axis z of the object holder, thus to the first joint axis $A_1$, in such a manner that they lie in perpendicular planes with the second joint axis $A_2$, being perpendicular to the plane containing the first joint axis $A_1$ and with the first joint axis $A_1$ being perpendicular to the plane containing the second joint axis $A_2$, but wherein the first and second joint axes $A_1$, $A_2$ of the first joint arrangement 33 are arranged free of intersections with respect to one another.

Figure 2:
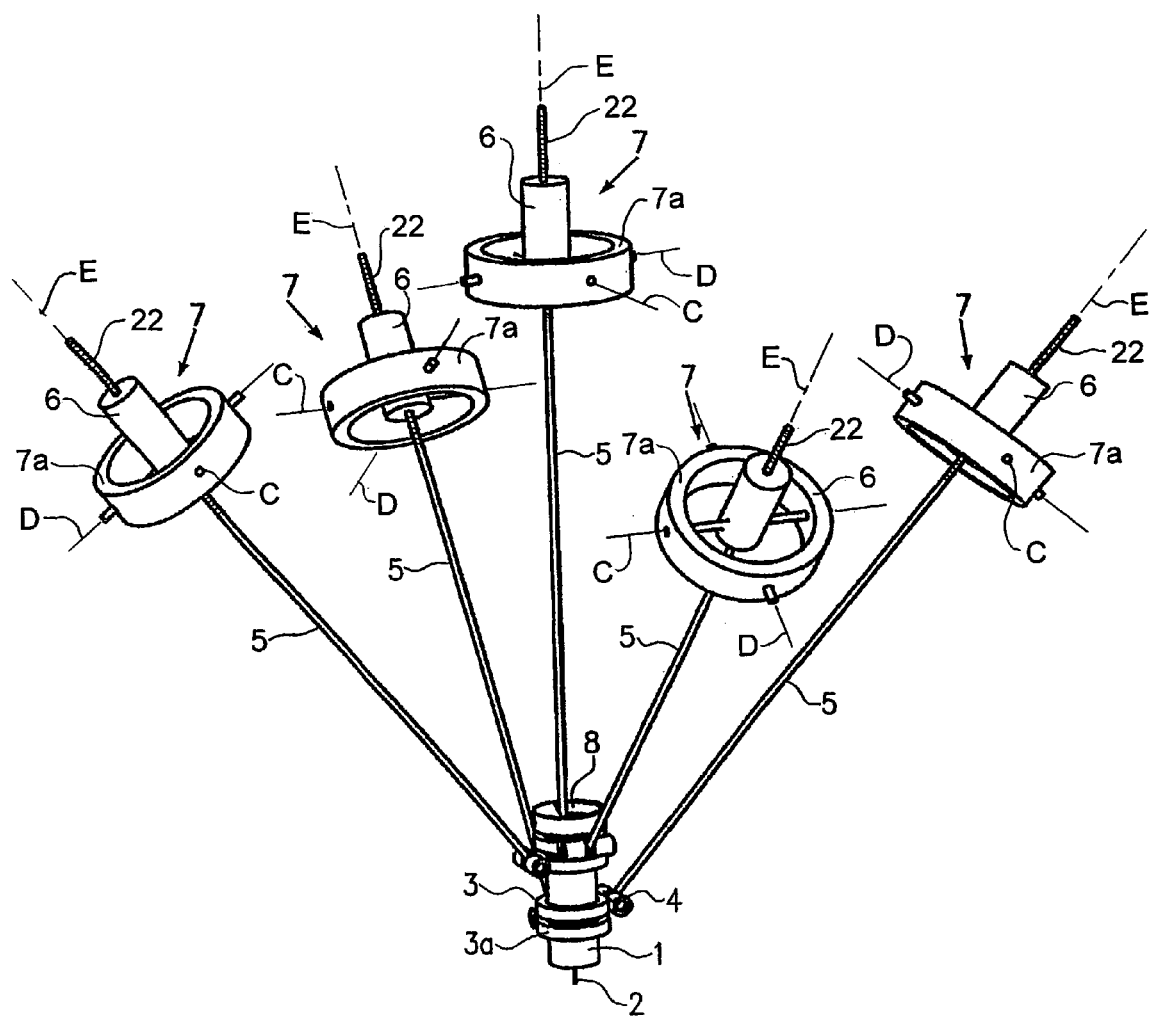
FIG. 2 is a schematic spatial illustration of a further embodiment.

The moving components of the joints 4 with one degree of freedom are connected fixed with the coupling links 5, which in the embodiment shown in FIGS. 1, 1a and 3 are formed as threaded struts. Consequently, in the illustrated embodiment this movement and/or positioning device exhibits five threaded struts 5, which lead, on the frame side, to a retention device with internal thread, in this embodiment a nut 6 in each case, which scres onto external threads 22 on the coupling links 5. The nuts 6 are each mounted on a cardan suspension 7 each with two degrees of freedom about the cardan axes C and D. As shown in FIGS. 1, 2, and 3, the nuts 6 are rotational in relation to the inner rings 7a about the axis C. The cardan suspensions 7 are in turn mounted individually on the frame 12 shown in FIGS. 4A, 4B, and 4C, where the outer rings 7b of the cardan suspensions 7 are arranged on selected faces 13 of the frame 12, as explained in more detail below.

Figure 4A:
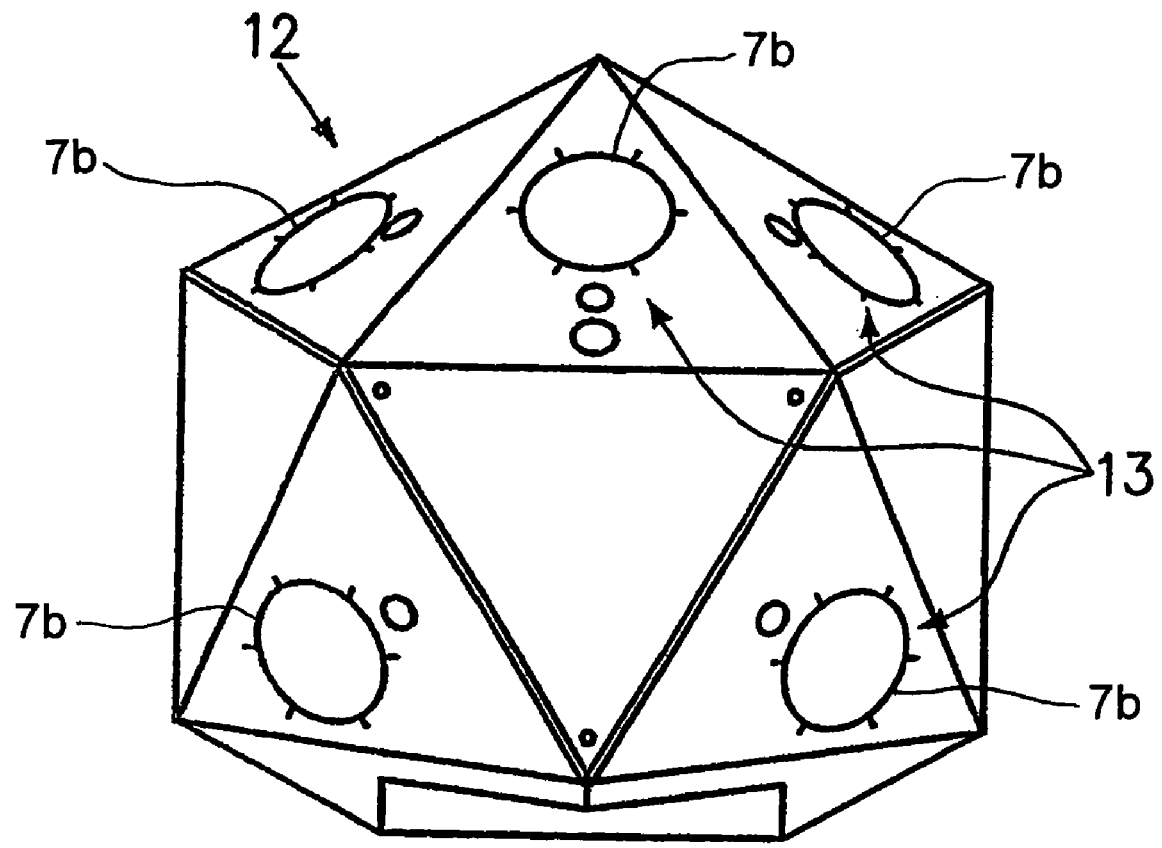
FIG. 4A is a schematic illustration of a top view of an embodiment of a frame of the movement and/or positioning device.
Figure 4B:
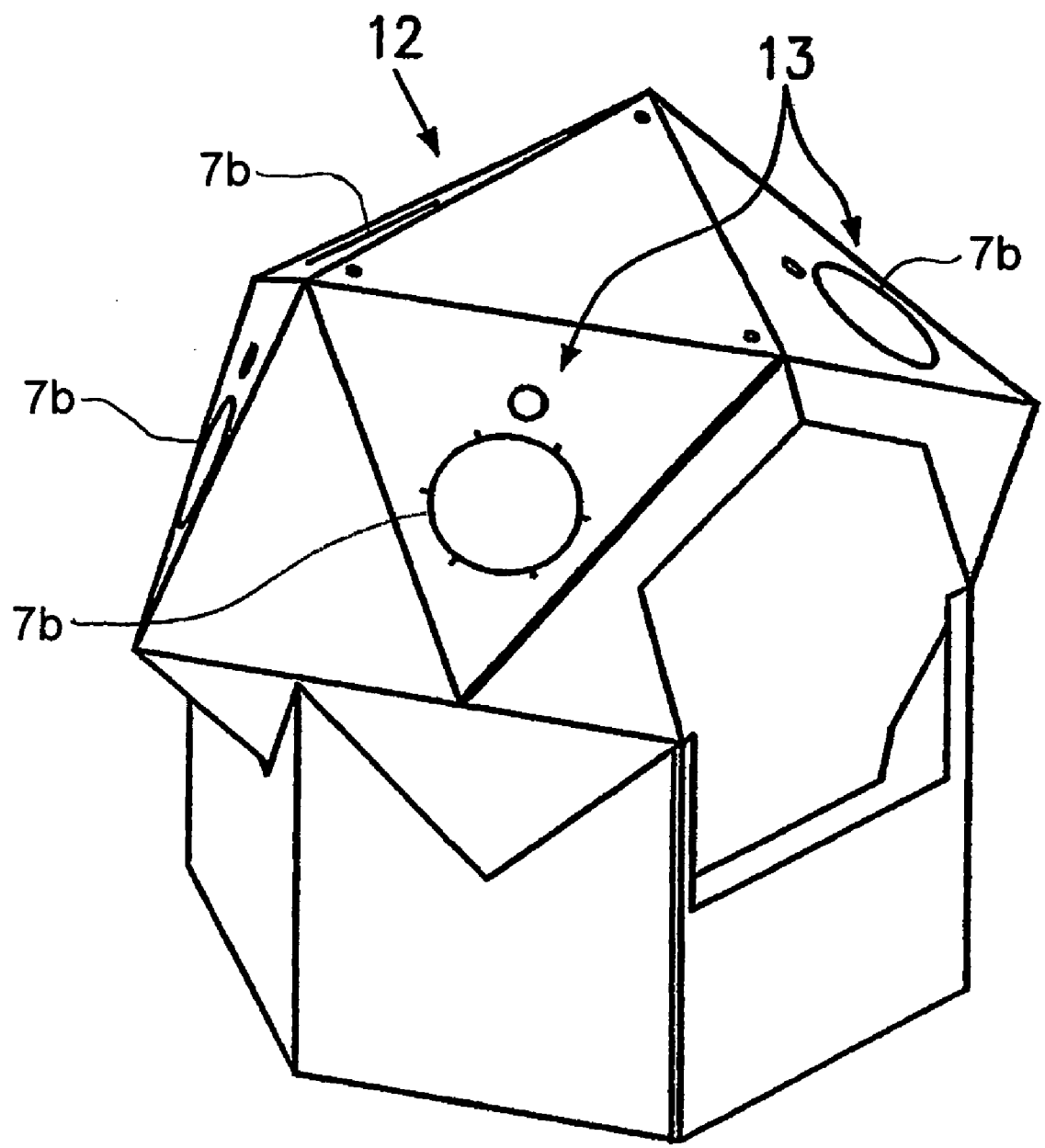
FIG. 4B is a schematic illustration of a first side view of the embodiment of a frame of the movement and/or positioning device in FIG. 4A.
Figure 4C:
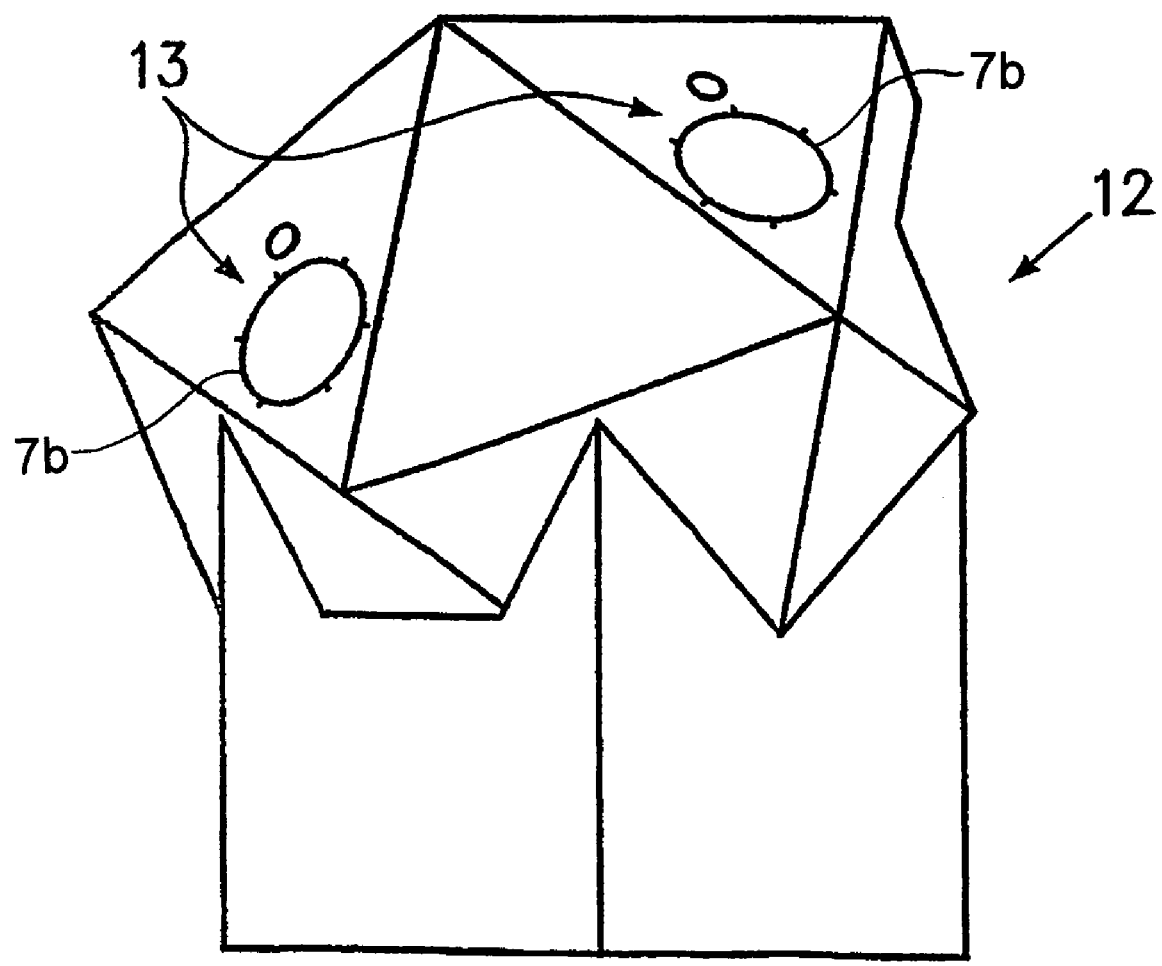
FIG. 4C is a schematic illustration of a second side view of the embodiment of a frame of the movement and/or positioning device in FIGS. 4A and 4B.

In the embodiments shown in FIGS. 1, 2 and 3, these cardan suspensions 7, the internal rings 7a of which are shown in FIGS. 1, 2, and 3, each exhibit two rotational degrees of freedom in the frame 12 (FIGS. 4A, 4B, and 4C). These cardan suspensions 7 are each realised by the two ring-shaped elements 7a, 7b, whereby the outer ring 7b (FIGS. 4A, 4B, and 4C) accommodates the inner ring 7a and this inner ring 7a is supported in the outer ring 7b for rotational movement about an axis D of the inner ring 7b. The outer ring is in turn supported in the frame 12 of this movement and/or positioning device. In this embodiment the axes C and D of the inner ring 7a and the outer ring 7b are arranged mutually perpendicular.

The nuts 6 are moved rotationally relative to the cardan suspension 7 using individual drive devices with respect to the longitudinal axes E of the threaded struts 5. Due to this sort of rotation of the nuts 6, a distance changes between a centre-point of the individual cardan suspensions 7 and the object 2, i.e. the milling spindle in the illustrated embodiment.

The milling spindle 2 can be moved in five degrees of freedom using this sort of variation of a distance with respect to all five threaded struts 5.

Accordingly, a movement and/or positioning device with five coupling links (struts) is illustrated in FIGS. 1, 1a and 3, which connect a frame 12 (FIGS. 4A, 4B and 4C) to an object 2 to be positioned, whereby the four struts 5 with the first arrangements 33 comprising sets of jointed rings 3 and joints 4, which each exhibit two degree of freedom, and a strut 5 with a second joint arrangement 35 comprising the ring 3a and joint 4, which exhibits one degree of freedom, are connected to the object holder 1. Here, in each case one of the joint axes A of the first joint arrangement 33 is coaxial to the longitudinal axis z of the object holder 1. In addition, the two joint axes $A_1$, $A_2$ of the first joint arrangement 33, which each exhibit two degrees of freedom, are arranged free of intersection with respect to one another.

An embodiment with five identical joint combinations, each with two degrees of freedom, is illustrated in FIGS. 1, 1a and 3, whereby the identical joint combinations each include a jointed ring 3, 3a and a further joint 4 with one degree of freedom, whereby four of the joint combinations are formed for rotation about the longitudinal axis of the object holder 1 and one of the joint combinations is formed rotationally rigidly about the longitudinal axis of the object holder 1.

The requirement for modularity is therefore fulfilled to a high degree.

Figure 2A:
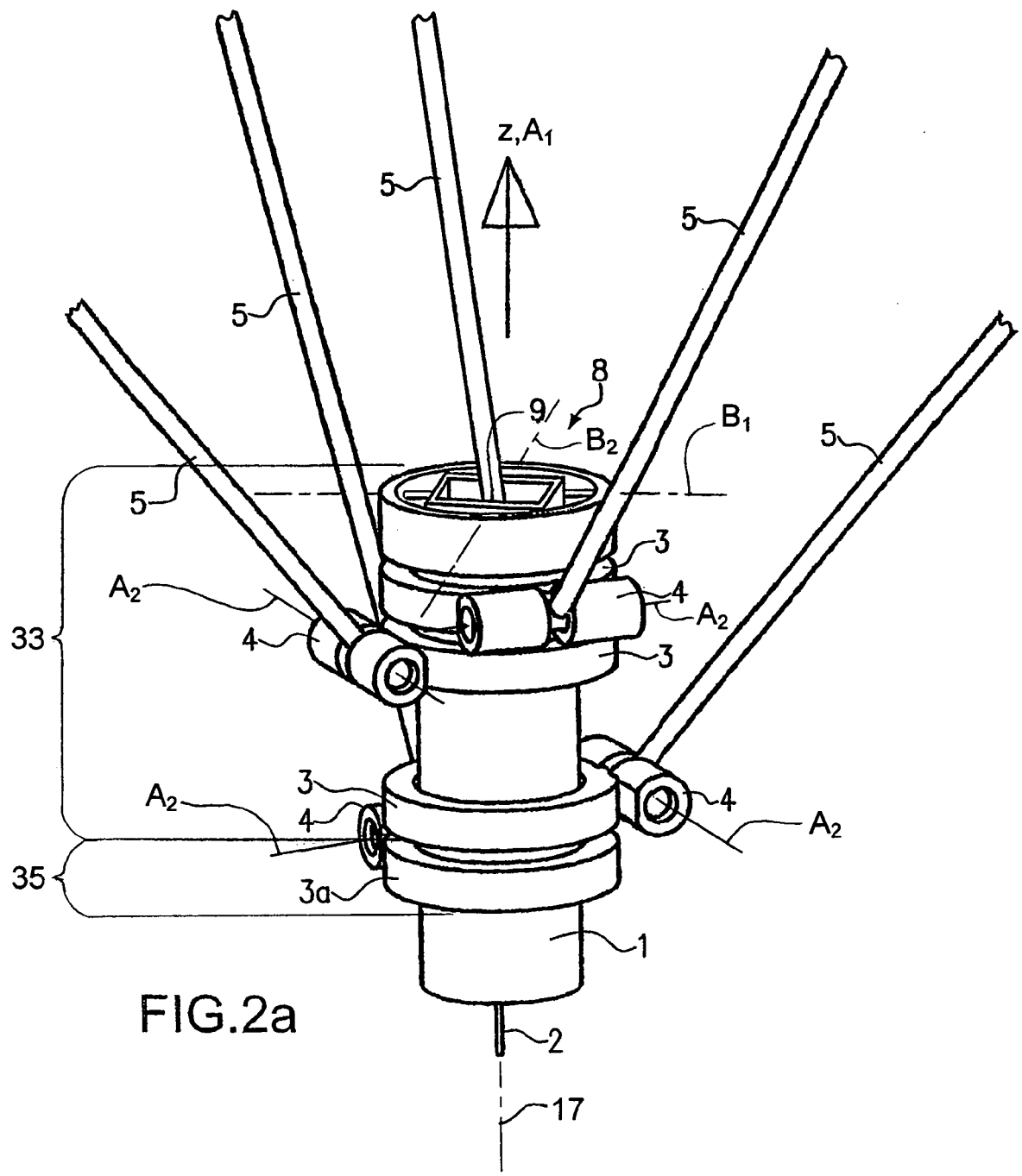
FIG. 2a is an enlarged illustration of the object holder according to FIG. 2 with a suspension of it and an object accommodated in it.

In FIGS. 2 and 2a a further embodiment of this movement and/or positioning device is shown for pentaxial movement and/or positioning of an object. In this embodiment one of the jointed rings 3 from the embodiment shown in FIGS. 1 and 1a, which accommodate the object holder 1 for rotation, is replaced by a cardan joint, in this embodiment by a universal joint 8. The joint axes $B_1$, $B_2$ of this universal joint 8 meet in a joint point 9 as best seen in FIG. 2a, whereby this joint point 9 is arranged on the longitudinal axis z of the object holder 1. The longitudinal axis z of the object holder 1 corresponds in this embodiment to the spindle axis 17.

Furthermore, the embodiment illustrated in FIGS. 2 and 2a exhibits three further jointed rings 3, which accommodate the object holder 1 for rotational movement with respect to the longitudinal axis of it.

In addition, the embodiment shown in FIGS. 2 and 2a exhibits a jointed ring 3a which supports the object holder 1 rotationally rigidly about its longitudinal axis z.

The further features of the embodiment illustrated in FIGS. 2 and 2a correspond to the features of the embodiment described in conjunction with FIGS. 1 and 1a.

Consequently, the embodiment shown in FIGS. 2 and 2a exhibits a universal joint 8 with two degrees of freedom and joint axes $B_1$, $B_2$ intersecting at a joint point 9, whereby this joint point 9 is arranged on the longitudinal axis z of the object holder 1.

All mixed forms between the different embodiments, which are illustrated in FIGS. 1 or 1a and 2 or 2a, can be realised. Consequently, one part of the coupling links 5 (struts) with the first joint arrangements 33 with separate joint axes $A_1$, $A_2$, of which one is the longitudinal axis z of the object holder 1, and the corresponding other part with the first joint arrangements 33 with the universal joint 8 and its intersecting joint axes $B_1$, $B_2$, the intersection point 9 of which is located on the longitudinal axis of the object holder 1, can be connected to the object holder 1.

With all these mixed forms one of the struts 5 is connected to the object holder 1 via a second joint arrangement 35 with exactly one degree of freedom. The second joint arrangement 35 is then reduced by one degree of freedom compared to the first joint arrangement 33 of the other struts 5. Torsion forces of the object holder 1 about the longitudinal axis z of the object holder 1 are then transferred as bending or torsion forces exclusively to just this strut 5 with the second joint arrangement 35.

Joining of the struts 5 to the frame 12 occurs, as explained at the start, by cardan suspensions 7 each with two degrees of freedom. In the embodiment illustrated in FIGS. 1, 1a, 2 and 2a the struts 5 are formed as threaded spindles 5, whereby a feed movement of the struts 5 is realised by rotating the nut 6 about the longitudinal axis E of the corresponding threaded spindle. In the other degrees of freedom of the cardan suspension 7, the relevant nut 6 is permanently connected to it, i.e. relative to the cardan suspension 7, the nut 6 has only one rotational degree of freedom about a longitudinal axis E of the corresponding threaded spindle 5.

Altrernatively to the formation of the struts 5 (coupling links) as threaded spindles or simultaneoulsy with a formation of this type, lifting cylinders (not illustrated) can be arranged between the cardan suspensions 7 and the sets 3,4 and/or universal joint 8 of the first joint arrangements 33, or the set 3a, 4 of the second joint arrangement 4 35. In this embodiment a further degree of freedom for rotating the struts about the strut axis is realised by arranging a drive. One side of the lifting cylinders is here accommodated in the cardan joints and the corresponding other side is connected to the first joint arrangements 33 or the second joint arrangement 35.

With the two mentioned embodiments of the coupling links 5 as threaded spindles and/or as lifting cylinders a distance between the centre-point of the cardan suspensions 7 and the spindle 2 (the object) is varied.

This movement and/or positioning device is however not restricted to this type of variation in the distance. In particular, with a fixed distance between the centre-point of the individual cardan suspensions 7 and the object 2, a movement and/or positioning of the object 2 can be realised by a displacement of the cardan suspension 7 along a controllable axis in the space. For example, these controllable axes can be arranged in each case along the longitudinal axis of the individual coupling links 5.

With this movement and/or positioning device the useful working space is on one hand restricted by the collision areas of the struts 5, and on the other hand the stiffness falls at certain positions in the working space. Consequently, not all swivel movements of the object 2 or of the object holder 1 can be realised or should be avoided due to a low level of stiffness.

The useful working space can be extended by adding a second (redundant) rotational axis (also known as an supplementary axis), which is arranged in the machine table 10, whereby full 5-sided machining of the work-piece 11 is facilitated. Here, the rotational axis of the machine table 10 can be coincidental with the Z axis. The supplementary axis here acts in conjunction with the previously described parallel kinematic system with five struts.

This type of embodiment with a rotary machine table 10 is illustrated in FIG. 3. In the illustrated position the spindle 2 is swivelled by approx. 90° with respect to the Z axis. A further swivel movement in a plane parallel to the X, Y plane cannot be carried out without restriction, because collisions between the coupling links 5 would occur. With the machine table 10 access to the work-piece 11 is obtained on all five sides. The high dynamic performance of the parallel structure is retained without restriction for local movements, whereby the machine table 10 need not necessarily exhibit a high dynamic performance.

A further enlargement of the working space is possible by the integration of the complete arrangement in further movement devices, in particular in so-called portal systems.

In order to be able to apply NC programs with a maximum of five programmable axes also to this type of movement and/or positioning device with a machine table 10 with a further rotational axis without restriction, the NC controller is provided with a programming module which realises the subdivision of the programming axes into the real existing six machine axes (coupling links 5 and the rotational axis of the machine table). To do this, the controller calculates a quality value (quality criterion) at the time of the limitation of acceleration and jerk values on the axes (look-ahead values) in which the machine stiffness at the working point and the spacing of collision areas are taken into account. The redundant additional axis (axes) are controlled such that this quality value is as large as possible.

Consequently, the NC program can be produced in five axes, whereby the control unit generates six machine axes on these five programming axes in that a quality criterion is computed in the control unit and an extreme value (minimum or maximum) is determined for this quality criterion. This enables the position of the sixth axis to be unambiguously determined. The control unit can thus convert five programming axes into six machine axes in real time in that it evaluates the additional quality criterion, for example a distance to the forbidden areas or a stiffness of the arrangement, and finds the extreme value.

Here however, only such velocity proportions of the overall movement are assigned to these axes such that the overall velocity does not need to be reduced because of them. Consequently, full five-sided machining in a clamp arrangement is realised without the loss of the dynamic advantages of this movement and/or positioning device also with a possibly slower rotating supplementary axis.

The NC programs for conventional five-sided machining are able to run on the combined machine system without adaptation. A strategy for the controller arises which enables NC programs for five axes (coupling links) to be able to proceed effectively when the machine exhibits more than five axes (redundant axes).

FIGS. 4A, 4B, 4C show an embodiment of the (machine) frame 12. The frame 12 is formed as an icosahedron. The outer joints of the coupling links 5, i.e. the cardan joints 7, are each arranged on one face 13 of the icosahedron base frame whereby the icosahedron base frame ensures a high stiffness.

A corresponding selection of icosahedron faces 13 on which the individual cardan joints 7 are arranged depends on the desired arrangement of the struts 5 (coupling links) relative to the object holder 1, whereby the desired arrangement of the coupling links 5 is determined dependent on the required working space and the necessary swivel angles of the object holder 1.

Apart from the described arrangement of the housing base frame as icosahedron, other polyhedrons can be realised as the housing base frame.

The invention claimed is:

1. Movement and/or positioning device for pentaxial movement and/or positioning of an object, with an object holder and five coupling links, which support the object holder in a frame, whereby four of the five coupling links are each connected to the object holder by a first joint arrangement each with two degrees of freedom and the corresponding other of the five coupling links is connected to the said object holder by a second joint arrangement with only one degree of freedom.

2. Movement and/or positioning device according to claim 1, characterised by a first type of first joint arrangements with two joint axes, whereby a first of the two joint axes is superimposed with a longitudinal axis of the object holder and/or a longitudinal axis of the object and the two joint axes are arranged free of intersection with respect to one another.

3. Movement and/or positioning device according to claim 2, characterised in that the two joint axes of the first type of first joint arrangements are arranged in perpendicular planes with each perpendicular to the plane containing the other.

4. Movement and/or positioning device according to claim 2, characterised in that the first type of the first joint arrangements exhibits a jointed ring, which supports the object holder rotationally about the longitudinal axis of the object holder and/or about the longitudinal axis of the object, whereby the jointed ring is connected to the corresponding coupling link by a further joint with one degree of freedom, in particular a hinged joint.

5. Movement and/or positioning device according to claim 2, characterised in that the longitudinal axis of the object holder coincides with the longitudinal axis of the object holder coincides with the longitudinal axis of the object.

6. Movement and/or positioning device according to claim 1, characterised in that the coupling links each are supported in the frame by a cardan suspension with two degrees of freedom.

7. Movement and/or positioning device according to claim 6, characterised in that a distance between the individual cardan suspensions and the first joint arrangements and/or the second joint arrangement is formed variable in length.

8. Movement and/or positioning device according to claim 7, characterised in that the coupling links are formed as threaded spindles, whereby the threaded spindles are accommodated for rotational movement in the individual cardan suspensions in each case in a retaining device with internal thread, in particular a nut, and whereby the nut can be rotated with respect to a longitudinal axis of the threaded spindles by a drive device.

9. Movement and/or positioning device according to claim 1, characterised in that the movement and/or positioning device is formed as a machine tool, whereby the object includes a spindle and the object holder a spindle housing.

10. Movement and/or positioning device according to claim 1, characterised by a machine table with a further rotational axis, in particular for accommodating a workpiece to be machined.

11. Movement and/or positioning device according to claim 10, characterised in that the rotational axis of the machine table is superimposed on the longitudinal axis of the object holder and/or on the longitudinal axis of the object.

12. Movement and/or positioning device according to claim 1, characterised by a control unit for the control of the movement and/or positioning of the object or of the object holder.

* * * * *